（12）United States Patent
Porzilli et al.

(10) Patent No.: US 8,995,243 B2
(45) Date of Patent: *Mar. 31, 2015

(54) SYSTEM AND METHOD FOR SUPPRESSING JITTER IN DIGITAL DATA SIGNALS INCLUDING IMAGE, VIDEO AND AUDIO DATA SIGNALS

(71) Applicant: Laufer Teknik, Inc., Roxbury, CT (US)

(72) Inventors: Mark Porzilli, Los Angeles, CA (US); Sam Laufer, Roxbury, CT (US)

(73) Assignee: Laufer Teknik, Inc., Roxbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,747

(22) Filed: May 24, 2013

(65) Prior Publication Data

US 2014/0347763 A1  Nov. 27, 2014

Related U.S. Application Data

(63) Continuation of application No. 13/007,074, filed on Jan. 14, 2011, now Pat. No. 8,451,701.

(60) Provisional application No. 61/295,402, filed on Jan. 15, 2010.

(51) Int. Cl.
G11B 20/18 (2006.01)
G11B 5/035 (2006.01)

(52) U.S. Cl.
CPC ....................................... G11B 5/035 (2013.01)
USPC ..................... 369/53.34; 369/53.35; 369/59.2

(58) Field of Classification Search
None
See application file for complete search history.

(56) References Cited

U.S. PATENT DOCUMENTS

| 4,536,718 | A | 8/1985 | Underhill |
| 4,746,870 | A | 5/1988 | Underhill |
| 4,847,875 | A | 7/1989 | Choi |
| 5,367,545 | A | 11/1994 | Yamashita et al. |
| 5,699,342 | A | 12/1997 | Yagi et al. |
| 5,737,373 | A | 4/1998 | Sato et al. |
| 5,828,414 | A | 10/1998 | Perkins et al. |
| 5,978,336 | A | 11/1999 | Mine et al. |
| 6,091,700 | A | * 7/2000 | Kobayashi ................. 369/275.4 |
| 6,127,859 | A | 10/2000 | Lim |
| 6,339,597 | B1 | 1/2002 | Osaki |
| 6,507,901 | B1 | * 1/2003 | Gopalakrishnan et al. ... 711/170 |
| 6,646,195 | B1 | 11/2003 | Puryear |
| 6,697,311 | B1 | 2/2004 | Kim |
| 6,802,447 | B2 | 10/2004 | Horng |
| 7,397,744 | B2 | 7/2008 | Terada et al. |
| 7,433,286 | B2 | 10/2008 | Ogura et al. |
| 7,447,864 | B2 | 11/2008 | Tachibana |

(Continued)

FOREIGN PATENT DOCUMENTS

| EP | 0 912 065 | 4/1999 |
| WO | WO-2008/069719 | 6/2008 |
| WO | WO-2010/003152 | 1/2010 |

*Primary Examiner* — Peter Vincent Agustin
(74) *Attorney, Agent, or Firm* — Leason Ellis LLP

(57) ABSTRACT

A system and method for suppressing jitter in a digital data signal in a signal processor system. The digital data signal has spaced apart byte allocation units wherein such spacing is increased such that unallocated bytes can be identified and removed from the digital data signal. The byte allocation units of the digital data signal are suppressed with a digital data signal being outputted from the signal processor system having suppressed byte allocation units to suppress the occurrence of jitter.

18 Claims, 4 Drawing Sheets

(56) References Cited

U.S. PATENT DOCUMENTS

| | | | |
|---|---|---|---|
| 8,451,701 B2* | 5/2013 | Porzilli et al. | 369/53.34 |
| 2003/0002866 A1* | 1/2003 | Owa et al. | 386/126 |
| 2003/0163327 A1* | 8/2003 | Morton et al. | 704/500 |
| 2004/0013059 A1 | 1/2004 | Sasaki et al. | |
| 2005/0036694 A1* | 2/2005 | Li et al. | 382/232 |
| 2005/0169132 A1* | 8/2005 | Kuraoka et al. | 369/47.14 |
| 2005/0219979 A1 | 10/2005 | Terada et al. | |
| 2005/0226145 A1 | 10/2005 | Garmire et al. | |
| 2005/0228854 A1 | 10/2005 | Steinheider et al. | |
| 2006/0143383 A1 | 6/2006 | Zohar et al. | |
| 2007/0286049 A1 | 12/2007 | Sasaki | |
| 2009/0003369 A1 | 1/2009 | Lundin | |
| 2009/0074012 A1 | 3/2009 | Shaffer et al. | |
| 2009/0181692 A1 | 7/2009 | Gaal et al. | |
| 2011/0176401 A1* | 7/2011 | Porzilli et al. | 369/47.17 |

* cited by examiner

SYSTEM AND METHOD FOR SUPPRESSING JITTER IN DIGITAL DATA SIGNALS INCLUDING IMAGE, VIDEO AND AUDIO DATA SIGNALS

CROSS REFERENCE TO RELATED APPLICATIONS

This patent application claims the benefit of priority under 35 U.S.C. Section 120 from U.S. patent application Ser. No. 13/007,074, filed Jan. 14, 2011, now allowed, and under 35 U.S.C. Section 119(e) from U.S. Provisional Application Ser. No. 61/295,402, filed on Jan. 15, 2010, each of which is hereby incorporated by reference as if set forth in their respective entireties herein.

FIELD OF THE INVENTION

The invention relates to a system and method for suppressing jitter in digital data signals.

BACKGROUND OF THE INVENTION

The memory structure in known signal processing systems uses small bytes to improve data integrity by enabling error-checking at a high frequency, due to the small byte size. While this method has applicability to certain signal processing environments (where bit count, as opposed to bit order and other integrity aspects, is the imperative) it does not extend well to signal processing environments where data integrity is imperative. In such situations, an accurate bit count is imperative. In other words, data checking mandates that the number of bits that go into a system are the same number that come out of the system. For example, when copying a Compact Disc (CD) which has 681 MB of data, if the copy is missing any bytes detected through error-checking such as error-correction code (ECC) processing, the ECC will add any missing bytes in order to achieve a lossless copy.

Such high error-checking frequency is achieved by dissection of the data to local memory for the purpose of error-checking, which is accomplished through caching. However, an undesirable result of caching occurs, and, due to inherent capacitances, inductances, slewing and reactances of chips, firmware and other hardware components, timing errors are dramatically increased. These timing errors manifest themselves in the output data stream as "jitter" which degrades data integrity.

Jitter is commonly known as a time variation of a periodic signal in electronics and telecommunications systems, often in relation to a reference clock source. Jitter may be observed in characteristics such as the frequency of successive pulses, the signal amplitude, or phase of periodic signals. Jitter is a significant and usually undesired factor in the design of almost all communications systems and links.

In the context of digital audio extraction from Compact Discs, jitter causes extracted audio samples to be doubled-up or skipped entirely if the Compact Disc drive re-seeks. The problem typically occurs during seeking because current audio CD standards do not require bit-accurate addressing but rather, byte accuracy only.

As a result, the extraction process may restart a few samples early or late, resulting in omitted samples that are replaced quantitatively through ECC. If ECC is not employed (in order to reduce the jitter created by ECC), these glitches often sound like small repeating clicks during playback. A successful approach of correction in software involves performing overlapping reads and utilizing the pre-knowledge of the type of structure the digital signal utilizes (for example, that a CD is composed of 8 bits/byte structures using 98 sectors/in 4096 allocation units) to find overlap at the edges. Most extraction programs perform seek jitter correction.

The dissection of data for the usage of caching, and the usage of caching itself, create undesirable time delays that cannot be circumvented due to the physics caused by the proximity of the hardware to each other or to foils or wiring of the circuit. Other time shifts are also caused by passive reactances and active temporal shifts from solid state devices' speed limitations (slewing).

Small bytes only amplify the situation, and are actually antagonistic to a system that depends on low jitter movement of data, such as systems adapted for audio, video and digital image presentation purposes. For example, in digital imagery, jitter does not increase pixilation but rather causes it to be more apparent. This is because the timing of when the pixels are created cause them to appear further apart, or misaligned with an adjacent pixel, similar to if a lower resolution were used. As another example, in digital audio applications, jitter manifests as the audio bands being separated from the remainder of the fundamental composite of music, that is, sibilance and high frequencies will be presented in a prominent and detached manner from the music.

In high end audio, where image recreation and sound staging depend upon near perfect temporal relationships, a particular band or aspect of the music will depart from the audio image, sometimes entirely. For example, the bass notes in a cello will emanate from the image until a note with jitter is played which will move towards or completely on the speakers and the sibilance as mentioned above, too will move out of the stereo image on to the speakers.

In the prior art there are two predominant methods for reducing the occurrence of jitter. The first is re-sampling, in which a data stream is interrupted by a circuit that has its own local clock. Such a circuit reformats the data to have a very low level of jitter and then passes the reformatted data onto the next piece of hardware. Re-sampling data does reduce jitter; however, once the data is reintroduced into a data processing system, every component in the data processing and in the post-re-sampling device has jittering attributes. Even the connection to a re-sampling device (e.g., a cable) can impart inductive attributes that introduce jitter to the signal. In fact, since resampling is so error prone due to the interruption of the signal and its own jitter components, most resampling devices simply "clip" the signal. That is, the signal is amplified slightly beyond the amplitude capabilities of the devices such that the signals are converted into very defined square waves which are very easily recognized as binary "1s" (indicating that an event is taking place or has taken place), and in doing so, eliminates at least this one aspect of ambiguity in digital data transmission, albeit at the expense of perfect accuracy with respect to determining a binary "0" (indicating a non-event or a vacancy where an event could take place) from a binary "1."

A second and more commonly used prior art method for reducing jittering is known as global clocking. This technique requires the use of an extremely high-precision clock of an atomic nature, typically using radioactive Rubidium. These global clocks become the timing reference for every point in the system requiring use of a clock. Significant drawbacks to using global clocks are that they are complicated to build and the reactance of this single point connection to each area of the data processing system that requires clocking creates a jittered point, however small. This jittered point can be system corrected if the hardware is known in advance, and therefore time delays or a phase shift may be built into the system to compensate for inter-hardware timing errors. Conversely, third party digital clocking devices cannot enjoy this compensation and their efficacies are thus dramatically reduced. Global clocks typically require significant hardware and encompass a large volume of area (e.g., the size of a typical full PC case or TV set). The typical atomic clock system costs approximately $100,000, rendering it cost prohibitive for data processing system environments requiring the suppression of jitter.

SUMMARY OF THE INVENTION

In one aspect, a system and method is described in which jitter is suppressed in a digital data signal using a signal processor system. At least a portion of the digital data signal is inputted from an external source into the signal processor system with the digital data signal having spaced apart byte allocation units. Spacing of the byte allocation units is increased as compared to the input signal such that unallocated bytes can be identified in the digital data signal. The unallocated bytes are removed and the byte allocation units of the digital data signal are suppressed preferably in a seriatim arrangement. A digital data signal is then output from the computer system having suppressed allocation units that result in a diminished occurrence of jitter.

These and other aspects, features, and advantages can be appreciated from the accompanying description of certain embodiments of the invention.

BRIEF DESCRIPTION OF THE DRAWINGS

The objects and features of the invention can be understood with reference to the following detailed description of certain embodiments of the invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the invention is shown. The invention is not limited in any way to the illustrated embodiment, as the illustrated embodiment described below is merely exemplary of the invention which can be embodied in various forms, as appreciated by one skilled in the art. Therefore, it is to be understood that any structural and functional details disclosed herein are not to be interpreted as limiting the invention, but rather are provided as a representative embodiment for teaching one skilled in the art one or more ways to implement the invention. Furthermore, the terms and phrases used herein are not intended to be limiting, but rather are to provide an understandable description of the invention.

Figure 1:
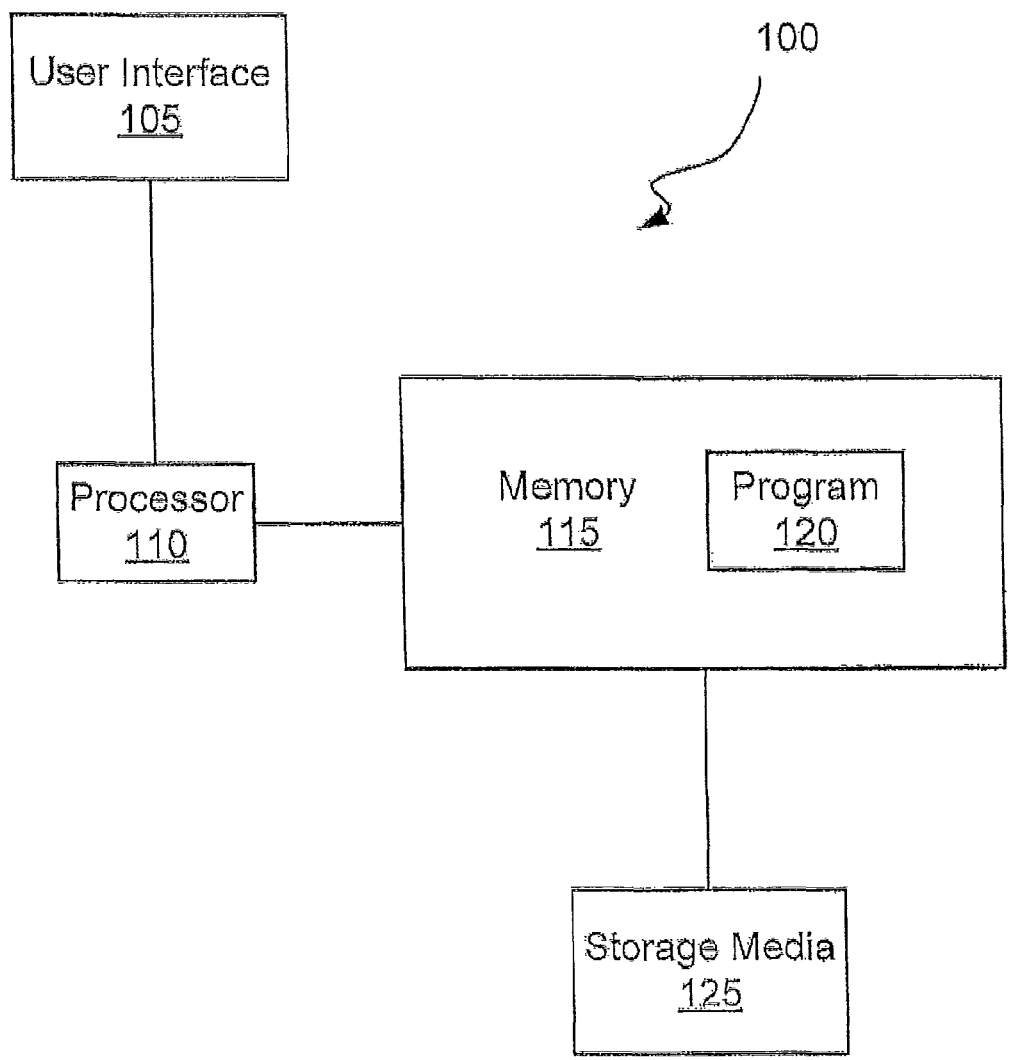
FIG. 1 is a block diagram of a computer system that can be used with certain embodiments of the invention.

It is to be appreciated that the embodiments of this invention as discussed below may be incorporated as a software algorithm, program or code residing in firmware and/or on computer useable medium (including software modules and browser plug-ins) having control logic for enabling execution on a computer system having a computer processor. Such a computer system typically includes memory storage configured to provide output from execution of the computer algorithm or program. An exemplary computer system is shown as a block diagram in FIG. 1 depicting computer system 100. Although system 100 is represented herein as a standalone system, it is not limited to such, but instead can be coupled to other computer systems via a network (not shown) or encompass other embodiments as mentioned below. System 100 preferably includes a user interface 105, a processor 110 (such as a digital data processor), and a memory 115. Memory 115 is a memory for storing data and instructions suitable for controlling the operation of processor 110. An implementation of memory 115 can include a random access memory (RAM), a hard drive and a read only memory (ROM), or any of these components. One of the components stored in memory 115 is a program 120.

Program 120 includes instructions for controlling processor 110. Program 120 may be implemented as a single module or as a plurality of modules that operate in cooperation with one another. Program 120 is contemplated as representing a software embodiment of the method 200 described herein below.

User interface 105 can include an input device, such as a keyboard, touch screen, tablet, or speech recognition subsystem, for enabling a user to communicate information and command selections to processor 110. User interface 105 also includes an output device such as a display or a printer. In the case of a touch screen, the input and output functions are provided by the same structure. A cursor control such as a mouse, track-ball, or joy stick, allows the user to manipulate a cursor on the display for communicating additional information and command selections to processor 110. In embodiments of the present invention, the program 120 can execute entirely without user input or other commands based on programmatic or automated access to a-data signal flow through other systems that may or may not require a user interface for other reasons.

While program 120 is indicated as already loaded into memory 115, it may be configured on a storage media 125 for subsequent loading into memory 115. Storage media 125 can be any conventional storage media such as a magnetic tape, an optical storage media, a compact disc, or a floppy disc. Alternatively, storage media 125 can be a random access memory, or other type of electronic storage, located on a remote storage system, such as a server that delivers the program 120 for installation and launch on a user device.

It is to be understood that the invention is not to be limited to such a computer system 100 as depicted in FIG. 1 but rather may be implemented on a general purpose microcomputer incorporating certain components of system 100, such as one of the members of the Sun® Microsystems family of computer systems, one of the members of the IBM® Personal Computer family, one of the members of the Apple® Computer family, or a myriad of other computer processor driven systems, including a: workstations, desktop computers, laptop computers, netbook computers, a personal digital assistant (PDA), or a smart phone or other like handheld devices. Additionally, for purposes of a below illustrated embodiment of the invention, implementation is also to be understood to include media playback systems, including audio, image, and/or video processing systems in which an input digital data signal stream is processed to produce an output audio and/or video signal, such as may be used to playback content served across a distributed computer network such as the Internet.

The method described herein has been indicated in connection with a flow diagram for facilitating a description of the principal processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

Figure 2:
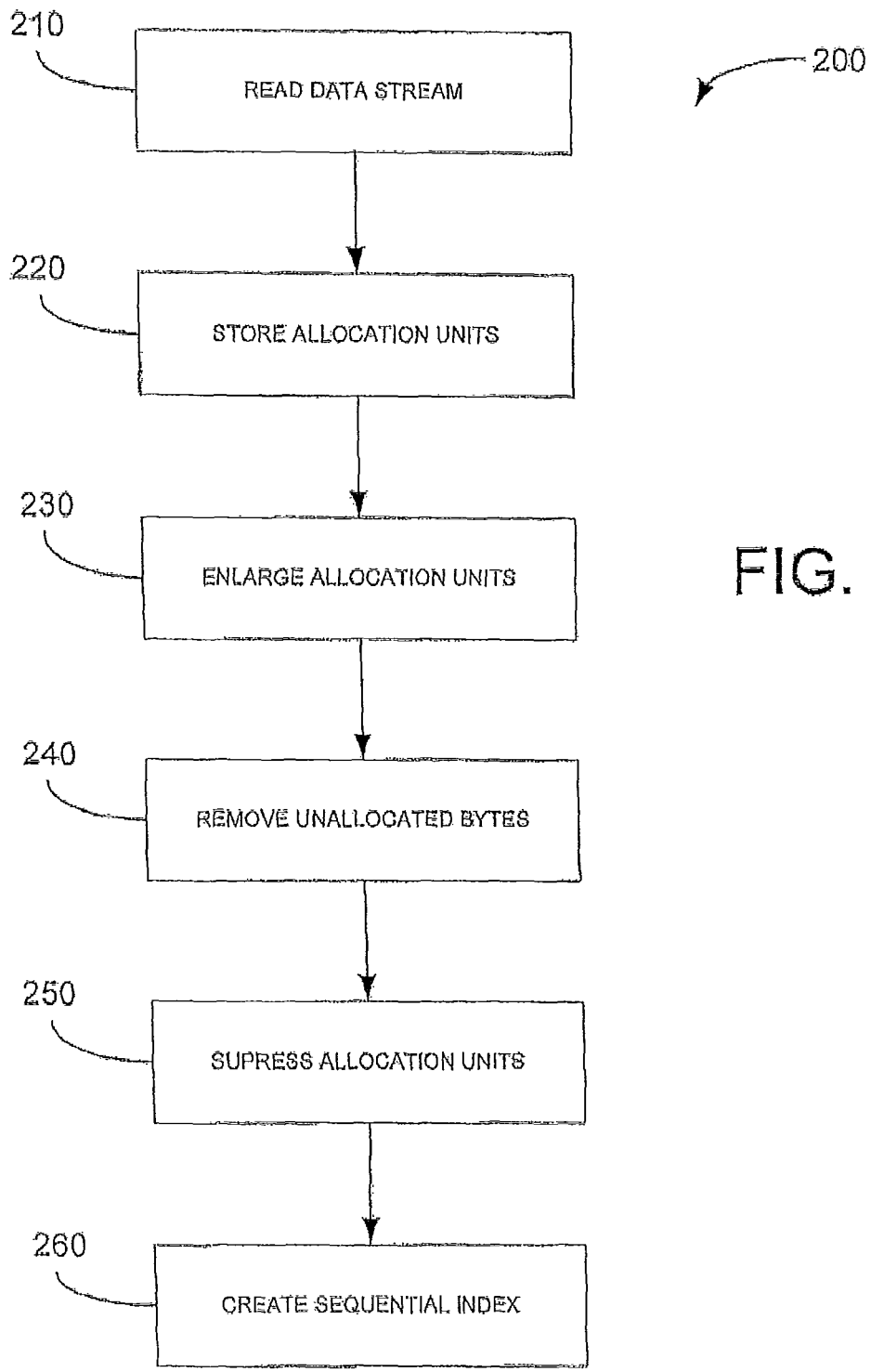
FIG. 2 is a flow chart depicting steps for suppressing jitter in digital data signals in accordance with certain embodiments of the invention.

With reference now to FIG. 2, a process, designated generally by reference numeral 200, for reducing jitter in a digital data signal processing system, such as a media player, in accordance with an illustrated embodiment will now be discussed as an embodiment of the program 120.

Figure 3:
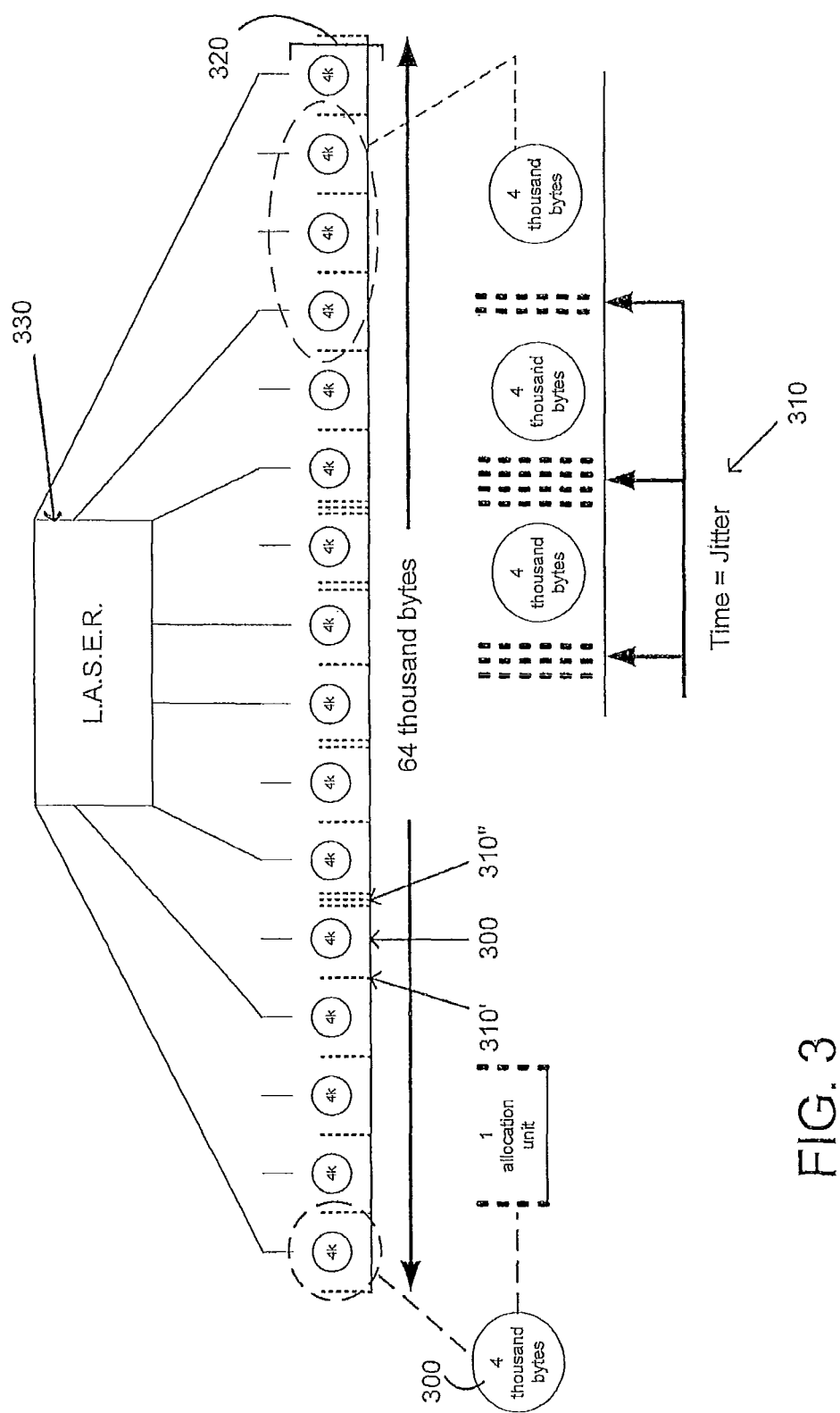
FIG. 3 illustrates a portion of a digital data signal having byte allocation units.

Starting at step 210, a data stream 320 (depicted in FIG. 3) is input to the processor 110 (e.g., included in a media player device and/or operating in conjunction with the media player application/software program) with a processor 110 temporarily storing at least a portion of the digital data signal for jitter suppression (step 220). It is to be appreciated that the digital data signal can originate from numerous memory, file, and/or data streaming sources, including but, not limited to web streaming and from, laser optical reading of a music/image/video/data CD, DVD or from other memory storage devices including flash memory components. FIG. 3 illustrates a portion of a 64K (64,000) byte data stream 320 being read as allocation units 300 by a laser optical playback system 330 used in computers and digital audio/video systems. The allocation units 300 typically range from 512 bytes to 4,096 bytes, though it should be understood that allocation units of any size could be similarly implemented, as will be described in greater detail below. Ideally, each allocation unit 300 is to be evenly spaced from one another; however, varying time lags 310', 310" from improper reading or environmental interference can cause additional time delays between certain allocation units, which are interpreted by a processing system as jitter 310—illustrated in FIG. 3 as a variable number of time intervals (indicated as dashed vertical lines).

Figure 4:
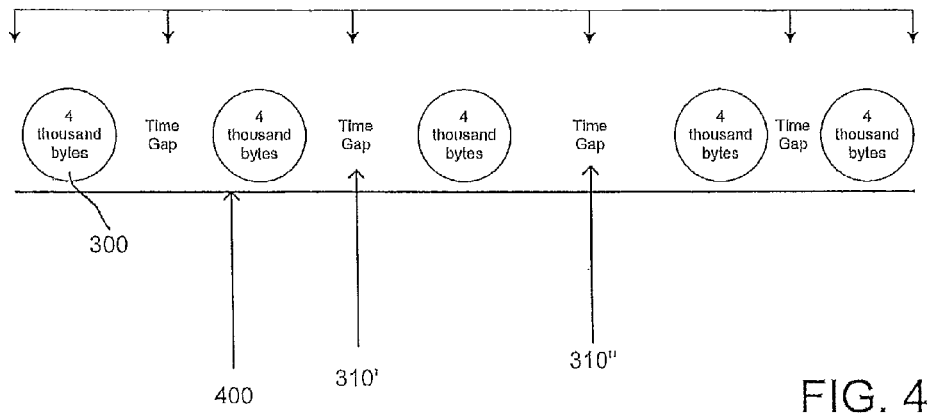
FIG. 4 illustrates a portion of the digital data signal of FIG. 3 having enlarged byte allocation units.

To suppress such jitter, the processor 110 is programmed by instructions executing therein (e.g., from program 120) and operative to enlarge the allocation units (AUs) to reduce dissection of the data stream 320 to reveal unallocated bytes (step 230), this operation herein referred to as the "impulse discharge" step. It is noted that these unallocated bytes create jitter with the resulting index inheriting the jitter, which jitter are then imposed on subsequent allocation units. It should be further noted that the term 'unallocated bytes' as used herein refers to unallocated bytes, temporary files, dynamic link library remnants, previously populated bytes, irrelevant bytes, bytes inconsistent with the data type in use, or practically any byte or bytes which are not an essential and/or inherent part of the data stream 320 itself, and/or which result in the presence of jitter. Typically, the enlarged allocation units 400 can range from 64,000 bytes to 65536 bytes in size (but is not to be understood to be limited thereto) and is generally limited only by the given system implementation limitations. As described in greater detail below, FIG. 4 depicts a portion of an enlarged AU 400 that comprises units of 4 k bytes 300 that previously existed as independent allocation units, as depicted in FIG. 3. The unallocated bytes referenced above include to the various 'Time Gaps' 310', 310" depicted in FIG. 4 which collectively correspond to jitter 310 depicted in FIG. 3.

At this juncture it should be noted that in most arrangements it is preferable that the byte value of the enlarged allocation unit(s) 400 be divisible by the byte value of the original allocation unit (AU) 300. (For example, as described above and depicted in FIGS. 3-5, the original allocation unit 300 has a value of 4000 bytes, thus an enlarged allocation unit 400 of 64,000 bytes (which is divisible by 4000—the value of the original allocation unit 300) is preferable. In another arrangement, where the original AU 300 has a value of 4096 bytes, the enlarged allocation unit 400 can have a value of 65536 bytes. In most systems, if the value being written does not comply with the given system's requirements, the system approximates the nearest value to 4096, or 4000 (if 64,000 bytes is used). To do so, a digital register pans a given value into subsequent bytes and uses binary '0's to pad the given value in order to fit the system's byte-sizing requirements. However, the addition of these additional '0's affects the system's timing and introduces jitter. This imperative is due to the file structure used by many systems which mandates an AU of 4096. In most operating systems (such as Microsoft® Windows, Apple® OS X, and Linux) if the AU is enlarged from 4000 to 4096, the equivalent computation will rise from 4000 to 4096 and its equivalent multiple, 65,536. The reason for this is that the absolute maximum value of the partition size is limited by a sequential master file table (MFT). Windows' New Technology File System (NTFS) circumvents this by rewriting the MFT ahead, wherein the volume '0' is referenced by the end of the previous volume's MFT such that each new MFT is read for each AU. Doing so allows a nearly unlimited partition size; however, any jitter created is inherited by subsequent reads, as will be described in greater detail below.

In order to address the referenced jitter inheritance problem, a sequential MFT/index (preferably of 64,000 or 65,536, as in the examples provided above) is written such that the read return is preferably zero and no legacy jitter is inherited. To overcome the partition size limitation the present system and method utilize one or both of two methods: partition panning and/or the copying of the data to a memory block in a sequential sequence—without any dissection, as will be described in greater detail below.

In accordance with the illustrated embodiment, allocation unit boundaries are discharged to over 125× that of their original topology, producing highly jittered but writable bytes. FIG. 4 illustrates a detail section of the 64 k byte stream 320 of FIG. 3 showing the enlarged allocation unit 400 having varying gaps of time 310', 310" (i.e., jitter) interposed between allocation units 300. In addition, to improper reading and/or environmental interference, these varying time gaps (jitter) 310', 310", are also created by the presence of unintended temporary files (such as 'pre-fetching' files used to accelerate the launching of commonly used applications/processes) and dynamic link library remnants.

A second stage in the impulse discharge step (step 240) implemented by the instructions executing in the hosting device (e.g., processor 110) is to refresh the memory containing the unallocated bytes to purge any aforesaid temporary files and dynamic link library remnants since their unintended presence represents unintended time gaps between the byte allocation units 300, resulting in jitter, as described herein.

Figure 5:
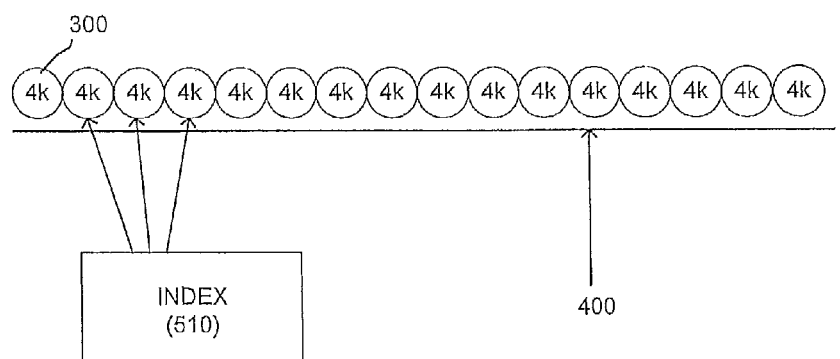
FIG. 5 illustrates the digital data signal of FIG. 3 having suppressed byte allocation units.

With reference to FIG. 5, a third stage of the impulse discharge step (step 250) executes and is operative to perform a (preferably oscillatory) defragmentation of the memory that contains the digital data signal (i.e., by removing jitter such as temporary files, added '0's, etc.) in order to arrange the data bytes 300 seriatim. It should be noted that conventional defragmentation applications use the previously defragmented block as a reference and thus become 'blind' to prior jittered references (and are thus highly ineffective as a defragmentation device with respect to removing jitter from a volume of data. Conversely, the defragmentation application of the present system and method requires a full return to the first '0' of the entire block of data, thereby not inheriting the 'jitter blind' properties of conventional defragmentation devices and techniques. Execution of these instructions arranges the data bytes 300 free of any allocation units between the bytes—as if no allocation units had ever existed between them. Next, at step 260, the instructions in the processor 110 create a sequential index 510 which—even though in certain embodiments it may be limited in size and speed—provides a reduction in jitter a thousand-fold or more compared to known jitter suppression techniques. In one arrangement, this is accomplished by deleting any refreshing MFT's used in conventional systems and generating a new sequential index 510. In contrast to the refreshing MFT's of prior art systems (which use the beginning of a given AU as a flag to begin clocking), the sequential index 510 creates an absolute or global index structure (MFT) having an absolute beginning and end. In prior art systems (such as Windows NT and OS X), new indices are created and deleted such that the index 'floats,' to ensure that the index does not grow too large, thereby ensuring compatibility with certain storage media and storage conventions. By combining the "impulse discharge" step (as described above) with the implementation of a sequential index, the present system removes most, if not all forms of jitter, and further ensures that no additional jitter is subsequently introduced (such as through timing errors, etc.).

Furthermore, it should be noted that in the present system and method, memory is structured and data is populated preferably in a sequential fashion. Thus, while many prior art systems utilize a 'nearest neighbor' technique to populate memory (such as RAM), the system disclosed herein populates data in its original, natural sequence. Thus, in the present system, the nearest vacancy on empty memory is populated with the next sequential bit presented, and thus no searching is necessary for the next sequential vacancy (In prior art systems, the population is performed out of sequence, thereby increasing jitter.) By sequentially populating memory, jitter levels can be drastically reduced, if not eliminated.

In an alternate arrangement, the "impulse discharge" step is performed on a hidden layer which erases legacy data (jitter such as temporary files, etc.) stored on the memory 115 and/or the storage media 125, compresses the legacy '0's (i.e., is used to fill space, as referenced above) off of the memory block, and writes the original data into the '0's without dissection and in original, temporal orderings. Preferably, in Windows-based systems, the following registry key should be written before removing dynamic link libraries: [HKEY_LOCAL_MACHINE\SOFTWARE\Microsoft\Windows\CurrentVersion\Explorer\AlwaysUnloadDLL] (or an equivalent in OS X systems).

It is to be appreciated the above described system and method for reducing/suppressing jitter in digital data signals provide a significant reduction/suppression of jitter. For instance, with regard to digital audio systems, nearly jitter-free optical disc playback from mediums such as a CD or DVD is provided along with significant improvement in sound quality, regardless of the memory medium format. As a result, the need for expensive hardware in order to achieve similar results is avoided. In regard to computer systems, the need for external computer clocking hardware for suppressing jitter is eliminated, and the high-cost high-precision clocks is obviated in favor of code and/or software in accordance with the above system and method for suppressing jitter.

In an alternate embodiment, the system and method disclosed herein can be modified to accommodate 64 bit computing architecture. In 64 bit architecture, the allocation unit can be expanded from 65,536 to 32,768,000 bytes. In such an embodiment, it is preferable that the index (or indices) 510 remain sequential as detailed above, wherein memory is populated sequentially, as opposed to using a 'nearest neighbor' approach). Doing so reduces the dissection by a factor of 512, or the smallest AU that supports a sequential index. In an arrangement utilizing an AU of 32,768,000 (termed "Open Byte"), it is estimated that a full 3 seconds of audio data can play before the first dissection occurs (approximately the time period of a single cycle at ⅓ Hz). Within the audio spectrum, a byte this large with a sequential index can remove 100% of jitter in any signal with a frequency lower than 16 Hz to 22 kHz. Despite the inherent spatial burden, the jitter reduction in such an embodiment is hundreds, if not thousands of times greater than even the Rubidium clocking technologies found in the prior art.

Additional advantages of the present invention include the provision of significantly faster data transfer speeds in computer systems. This is because significantly large allocation units that are of a multiple of 16, enables over 16 times more data to pass through a given system than is currently possible with WINDOWS, APPLE or LINUX-based systems. For example, a normal computer hard-drive utilizing the above described method for suppressing jitter vs. a typical WINDOWS OS can run almost all processes, and especially data transfers, approximately 20 to 25% faster, without any other changes made to existing hardware or adding additional hardware to the system.

The 32,768,000 byte "Open Byte" (referenced above) allows for even faster results, increasing data transfer speeds by a factor of 8000. While the limitations of presently available systems and/or drives may prevent the full realization of this potential, systems and/or drives configured to utilize the "Open Byte" can achieve such results.

A further noted advantage is when used with the processing of large allocation units, the above described method and system for suppressing jitter dynamically purges irrelevant or old data, and simultaneously de-fragments the data on a per-sample basis—achieving atomic clocking jitter levels without the need for costly atomic clock components. For instance, it can render a 65,536 wide allocation unit nearly jitter-free so as to be aligned with the next allocation unit to be written, to a theoretically femtosecond jitter accuracy level.

Therefore, in accordance with the above illustrated embodiments of the invention, what has been described is a system and method which removes temporal time distortions during optical playback between data allocation units free of the need for costly and cumbersome hardware components. It is mentioned again that while the above illustrated embodiments of the invention have been described in conjunction with a media player and/or computer system, it is not to be understood, to be limited thereto as it may be implemented in any format where it is desirable to reduce the effects of jitter during playback and/or processing of digital data signals. For instance, it may be incorporated in a software or plug-in module (e.g., FLASH PLAYER) for use with an Internet browser or a standalone software media player (e.g., QUICKTIME) for suppressing the effects of jitter in a digital data signal streaming from the Internet.

In alternative arrangements, the present system and method can be applied in settings including digital imagery and video. For example, improved jitter removal system and method disclosed herein enables the alignment of the bits in a digital image such that the pixilation effect is less obvious, as the pixels blend together more closely. In digital video, advantages similar to those in audio files will result, as described in detail above. The present system and method can also be applied in other settings, such as voice processing, printing, and/or practically any other setting where the reduction of jitter in a data file would be beneficial.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the scope of the present invention.

What is claimed is:

1. A method for suppressing jitter in a digital data signal comprising the steps of:
    inputting at least a portion of a digital data signal stored on a storage medium into a digital data signal processor with the digital data signal having byte allocation units;
    identifying unallocated bytes in the digital data signal with the digital data signal processor;
    removing unallocated bytes from the digital data signal using the digital data signal processor;
    generating from the digital data processor a digital data signal having no unallocated bytes, thereby suppressing the occurrence of jitter; and
    outputting the digital data signal having no unallocated bytes to a media playback system,
    wherein the output signal is a digital audio signal, a digital video signal, or a digital image.

2. A method for suppressing jitter as recited in claim 1, wherein the digital data signal processor is contained in the media playback system.

3. A method for suppressing jitter as recited in claim 1, wherein the inputting step includes using a laser optical reader to input the digital data signal.

4. A method for suppressing jitter as recited in claim 1 wherein the inputting step includes receiving a digital data signal streamed over a network connection.

5. A method for suppressing jitter as recited in claim 1, further comprising the step of increasing a spacing between the byte allocation units.

6. A method for suppressing jitter as recited in claim 1, further comprising the step of suppressing the byte allocation units in the digital data signal.

7. A method for suppressing jitter as recited in claim 1, further comprising the step of creating an index corresponding to the digital data signal.

8. A method for suppressing jitter as recited in claim 1, wherein the digital data signal comprises the digital image having pixels and wherein the outputting step blends the pixels together such that a pixilation effect is less obvious in the output signal.

9. A method for suppressing jitter as recited in claim 7, wherein the index is a sequential index.

10. A method for suppressing jitter in a digital data signal, comprising the steps of:
    under control of instructions executing in a processor, increasing a spacing between byte allocation units;
    removing from at least a portion of the digital data signal any unallocated bytes from the digital data signal; and
    outputting the digital data signal after the removing step as a playback signal that is free of the unallocated bytes, thereby suppressing jitter,
    wherein the output playback signal is a digital audio signal, a digital video signal, or a digital image.

11. The method of claim 10, including the additional step of suppressing the byte allocation units in the digital data signal.

12. The method of claim 10, including the additional steps of storing at least a portion of the digital data signal before increasing the spacing between byte allocation units.

13. The method of claim 12, including the additional step of suppressing the byte allocation units in the digital data signal.

14. A system for suppressing jitter in a digital data signal, the system comprising:
    a storage medium for storing the digital data signal;
    a processor operatively connected to the storage medium for processing the digital data signal; and
    instructions stored upon the storage medium and executing in the processor to control the processor to:
        identify a spacing between byte allocation units associated with the digital data signal;
        increase a spacing between the byte allocation units;
        remove unallocated bytes from the digital data signal; and
        output as a playback signal the digital data signal having fewer unallocated bytes, thereby suppressing jitter,
    wherein the output playback signal is a digital audio signal, a digital video signal, or a digital image.

15. The system of claim 14, wherein the processor is a 32-bit processor.

16. The system of claim 14, wherein the processor is a 64-bit processor.

17. The system of claim 14, wherein the instructions executing in the processor are further operative to suppress the byte allocation units in the digital data signal.

18. The system of claim 14, wherein the instructions executing in the processor are further operative to create a sequential index corresponding to the digital data signal.

* * * * *